US008925797B1

(12) United States Patent
Bohen et al.

(10) Patent No.: US 8,925,797 B1
(45) Date of Patent: Jan. 6, 2015

(54) STORAGE MODULE FOR UNFIT DENOMINATIONS

(75) Inventors: Daniel Christopher Bohen, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1231 days.

(21) Appl. No.: 12/323,027

(22) Filed: Nov. 25, 2008

(51) Int. Cl.
*G06Q 40/00* (2012.01)

(52) U.S. Cl.
USPC .......................................................... 235/379

(58) Field of Classification Search
CPC .... G07F 19/20; G07F 19/201; G06Q 20/1085
USPC .......................................................... 235/379
See application file for complete search history.

(56) References Cited

U.S. PATENT DOCUMENTS

2004/0003980 A1 * 1/2004 Hallowell et al. ............. 194/206

* cited by examiner

*Primary Examiner* — Rafferty Kelly
(74) *Attorney, Agent, or Firm* — Banner & Witcoff, Ltd.; Michael A. Springs

(57) ABSTRACT

A currency handling device may convert a first recycling unit to a holding unit andto receive and store notes unfit for recycled circulation. The currency handling device may reallocate a second recycling unit to store a frequently recycled currency. Thereafter, deposits or withdrawals conducted with respect to the currency handling device may access or store currency in the converted or reallocated recycling units. The frequently recycled currency may be determined based on one or more trends.

21 Claims, 8 Drawing Sheets

INITIAL ALLOCATION OF RECYCLING UNITS, PRIOR TO REALLOCATION

INITIAL ALLOCATION OF RECYCLING UNITS, PRIOR TO REALLOCATION

ALLOCATION OF RECYCLING UNITS, AFTER REALLOCATION TO ACCOMMODATE SALES OF INEXPENSIVE MERCHANDISE

ALLOCATION OF RECYCLING UNITS, AFTER REALLOCATION TO ACCOMMODATE SALES OF HIGH-END MERCHANDISE

STORAGE MODULE FOR UNFIT DENOMINATIONS

FIELD

Aspects of the present disclosure relate to a cash handling device. More specifically, aspects of the invention relate to storage of unfit denominations and mixed large denominations that are infrequently recycled.

BACKGROUND

Computing technologies have changed the way people accomplish various tasks. For example, a teenager may withdraw cash from a cash handling device (e.g., a cash recycler or an automated teller machine (ATM)) located at a strip mall in order to purchase inexpensive charm bracelets from a store in the strip mall. At the close of the business day the store owner may deposit cash with the cash handling device in order to have the cash credited to an account associated with the store. Thus, the store owner may present a large quantity of relatively small denominations (e.g., five dollar bills and one dollar bills), as well as a small quantity of relatively larger denominations (e.g., one hundred dollar bills and fifty dollar bills), to the cash handling device for deposit.

Traditional cash recycling equipment (an ATM is one example) are not always able to deal with practical usages and field applications. More specifically, cash recyclers in current use typically have between four and eight recycling units wherein each recycling unit facilitates exchange/reuse of a given currency denomination. The environment in which the cash recycling equipment is implemented will frequently dictate the nature of the transactions that are performed. Continuing the above example regarding a strip mall catering to inexpensive merchandise (e.g., charm bracelets), the smaller denominations may dominate with respect to the transactions conducted with respect to the cash handling device. Thus, a surge in deposits (e.g., by store owners) or withdrawals (e.g., by customers/clientele) may quickly cause an excess or shortage, respectively, requiring servicing, e.g., by a bank or a transport carrier.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects described herein are directed to an allocation of a recycling unit for use with unfit denominations. A recycling unit may be configured to accept one or more denominations that are taken out of recycled-circulation. The one or more denominations that are taken out of recycled-circulation may be intermixed or may in turn be separated out by denomination to support ease of service and counting. The one or more denominations that are taken out of recycled-circulation may dispense to a carrier for removal from the recycling unit.

Further aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

In one aspect, an end-to-end currency, handling and servicing device is provided to any cash-centric business or enterprise. In various embodiments, the method, apparatus, and system may provide cash handling device set up and balancing, back office reconciliation, and other cash payment handling activities.

According to another aspect, a cash handling device may reallocate or perform inventory verification with respect to a portion of funds remaining within the cash handling device after servicing based on one or more transactions with respect to a given currency system. Inventory verification is described in greater detail in co-pending U.S. patent application Ser. No. 12/241,196, entitled "Transportation Withdrawal and Inventory Verification of Cash Handling Device," and filed on Sep. 30, 2008, and now U.S. Pat. No. 7,950,512, the contents of which are fully incorporated herein by way of reference.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing currency handling services. A cash handling device such as a cash recycler may provide for allocation of a recycling unit contained therein as a holding repository for denominations of currency taken out of recycled-circulation. For illustrative purposes the financial instrument discussed throughout the below description is cash. However, as those skilled in the art will realize, the described aspects of the invention are not limited to just cash (paper money and coins), but may also include other forms of liquid assets such as checks, bank notes, and money orders, as well as credit and debit card receipts/transactions, all generally referred to herein as currency. Furthermore, the description provided below discusses the usage of recycling units for purposes of handling cash. Recycling units include any module suitable for handling cash, such as stackers and rolled stored modules (RSMs). It is understood that the cash handling device may be configured with alternative mechanisms for supporting the operations described.

Figure 1:
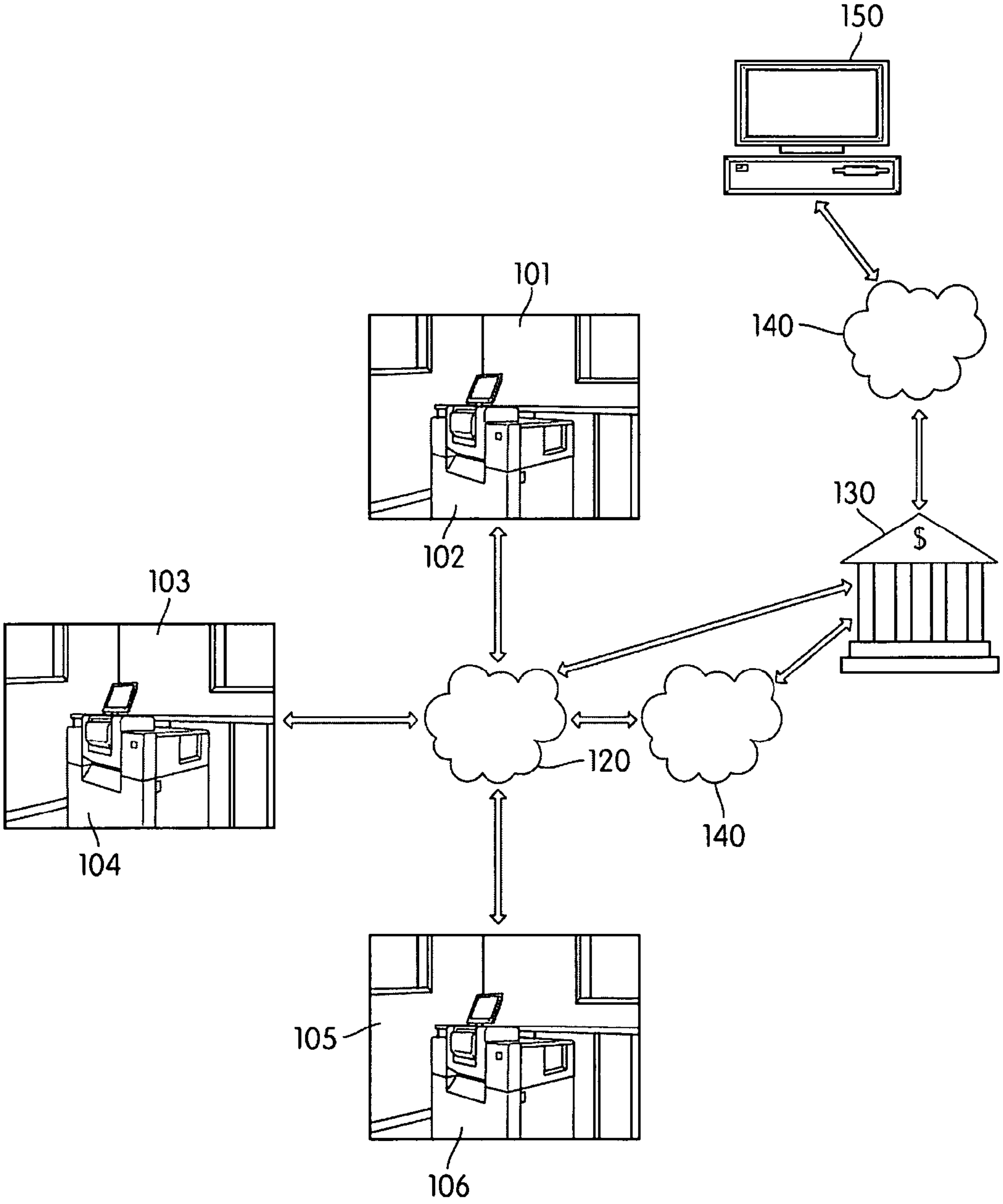
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
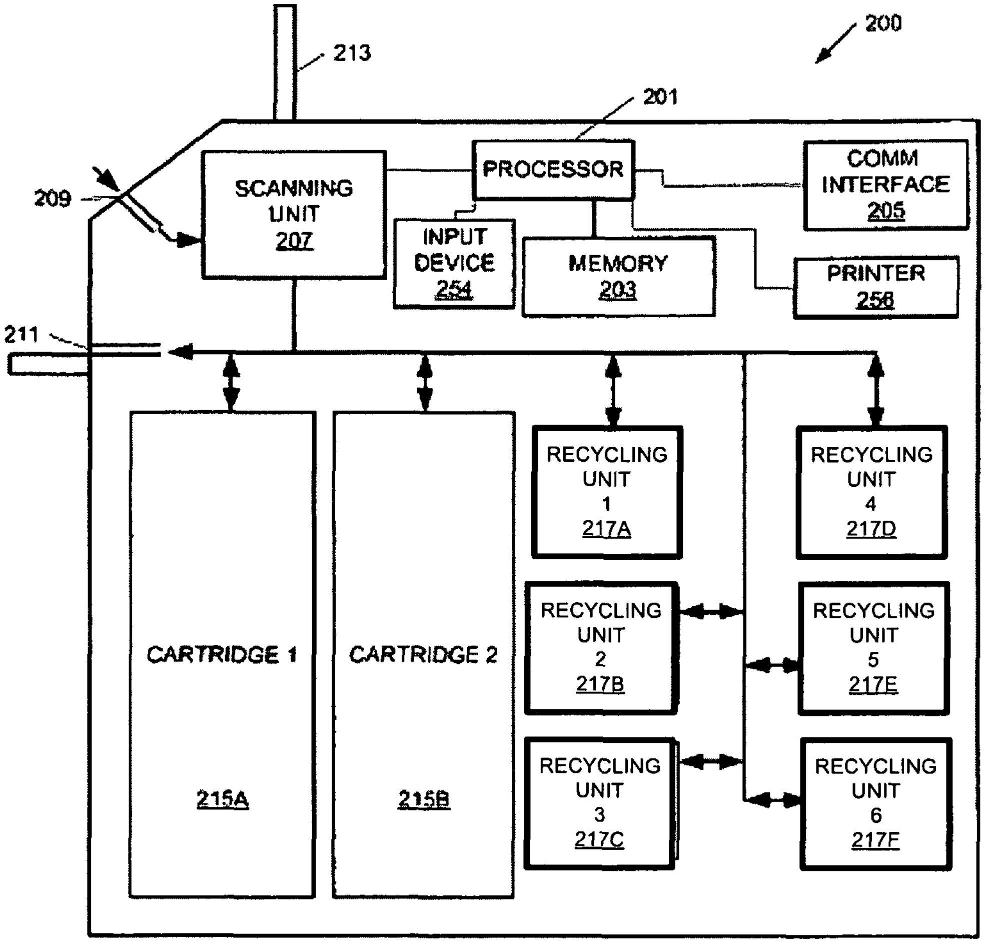
FIG. 2 illustrates a diagram of a cash recycler in which various aspects of the disclosure may be implemented.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217 may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, invalid reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between recycling units 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Recycler 200 depicted in FIG. 2 is merely illustrative, and it is understood that one or more of the entities, modules, or units depicted therein are optional in some embodiments. For example, one or both of cartridges 215A-215B may be excluded in some embodiments. Thus, in some embodiments, recycler 200 may lack designated or traditional overflow capacity. In those embodiments, designating one (or more) of recycling units 217 as a holding unit for receiving and storing unfit notes that might not require recycling may provide extra storage capacity for frequently recycled denominations as further described below. In some embodiments, entities, modules, or units not shown in FIG. 2 may be added to recycler 200, without departing from the scope of the instant disclosure, in order to enhance the functionality of recycler 200.

Figure 3:
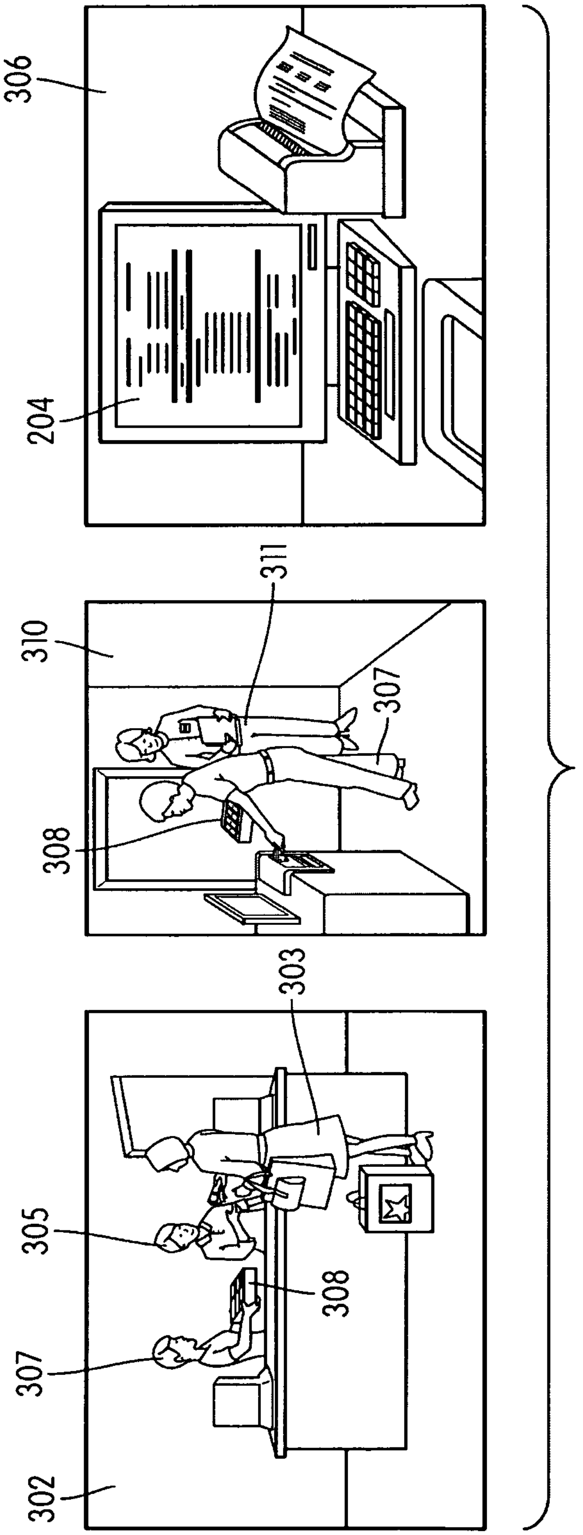
FIG. 3 illustrates features of a cash recycler in which various aspects of the disclosure may be implemented.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
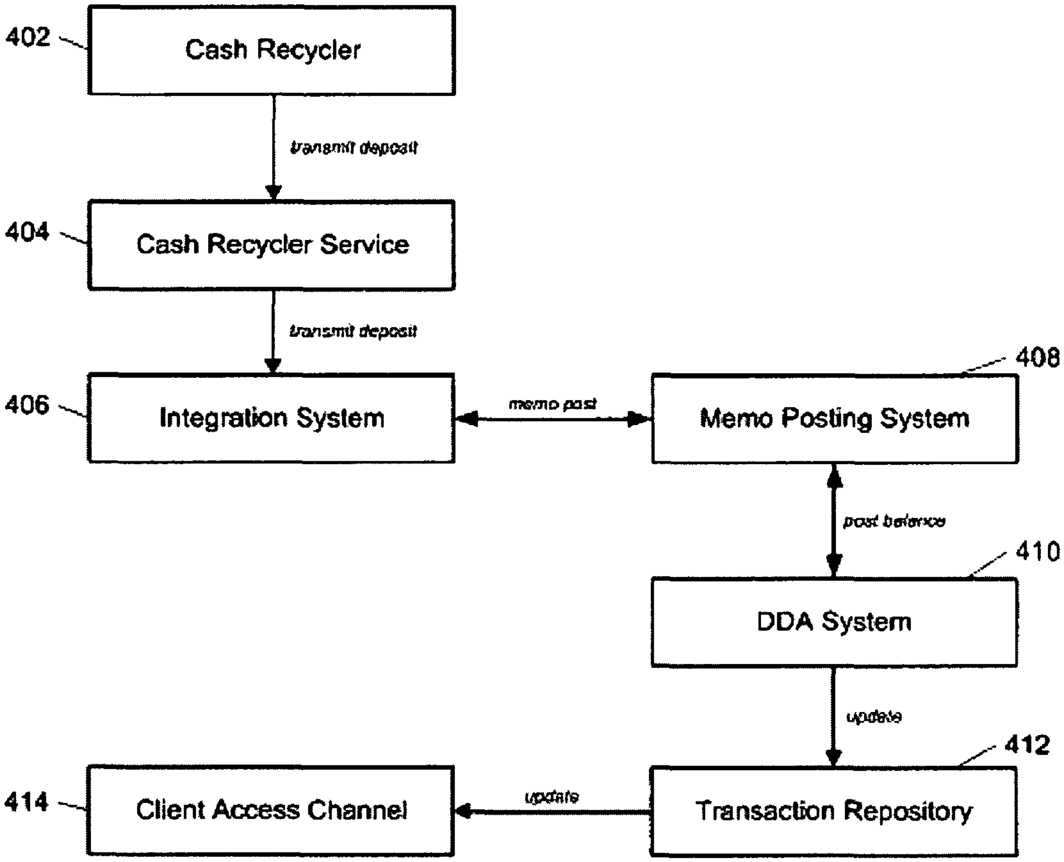
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and now U.S. Pat. No. 7,635,085, the content of which is incorporated herein by reference in its entirety.

As further described below, one or more of recycling units 217 of FIG. 2 may be designated as a holding unit for receiving and storing unfit notes. The holding unit may be specifically designated during design and fabrication of cash recycler 200 or may be designated in an on-demand fashion. The designation may take place via hardware or firmware design. Alternatively, or additionally, software (e.g., a software patch) may be used to provide for the designation of a holding unit. The use of software may facilitate the designation with respect to legacy cash recycler platforms already in the field (e.g., in service), thereby precluding a need to recall or replace the legacy platforms.

Figure 5A:
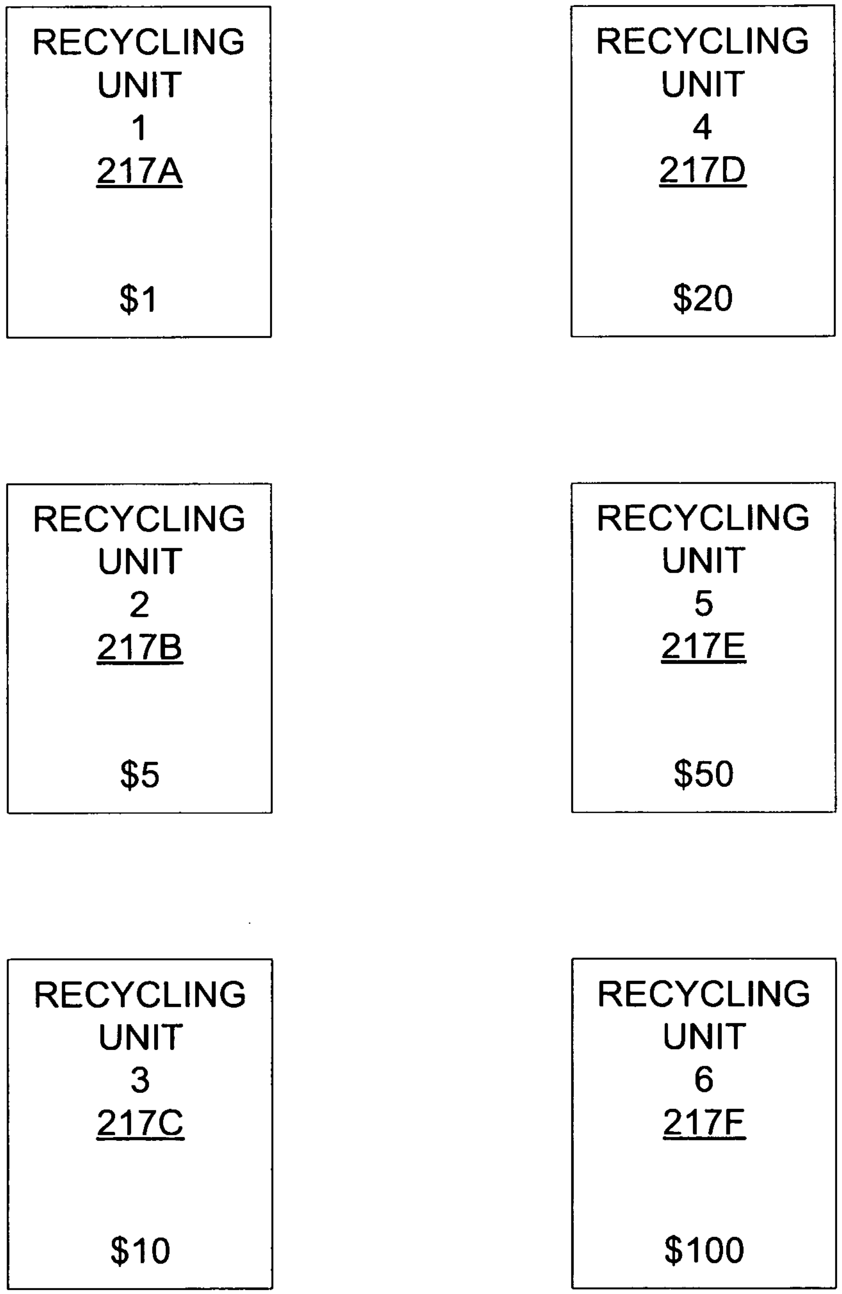
FIGS. 5A-5C illustrate a use case scenario suitable for demonstrating one or more aspects of the invention.

FIG. 5A shows a conventional or standard allocation of recycling units 217. More specifically, the allocation may be as follows: one dollar bills (217A), five dollar bills (217B), ten dollar bills (217C), twenty dollar bills (217D), fifty dollar bills (217E), and one hundred dollar bills (217F), in terms of United States currency.

When a cash recycler is used in the field, the various recycling units 217 frequently are not exercised to the same degree. For example, recycling units 217A and 217B may be exercised more frequently relative to recycling units 217E and 217F if the cash recycler 200 that includes recycling units 217A-217F is intended to service a business that sells inexpensive merchandise (e.g., charm bracelets). Conversely, if the cash recycler 200 is intended to service a business selling more expensive merchandise (e.g., high-end electronics, diamond jewelry, and the like), recycling units 217E and 217F may be exercised more frequently than recycling units 217A and 217B.

Efficient use of recycling units 217 may be realized by allocating one or more of recycling units 217 as a holding unit for unfit notes that might not require recycling. Continuing the above examples, if the cash recycler 200 is intended to service a business selling inexpensive merchandise, recycling unit 217F that was initially intended to store one hundred dollar bills (as shown in FIG. 5A) may instead be designated as a holding unit. Holding unit 217F may be used to store larger denominations (e.g., one hundred dollar bills and fifty dollar bills), or more generally, denominations that are recycled less frequently or that are not intended to be recycled. Recycling unit 217E, which was previously used to store fifty dollar bills, may be reallocated to storing cash that is recycled with greater frequency (e.g., one dollar bills). In order to effectuate the reallocation, the fifty dollar bills (initially) present in recycling unit 217E may be routed to recycling unit 217F that has been converted to a holding unit.

Because the larger denominations might not be intended for recycling, the mixing of denominations, e.g., in holding unit 217F might not be an issue.

Figure 5B:
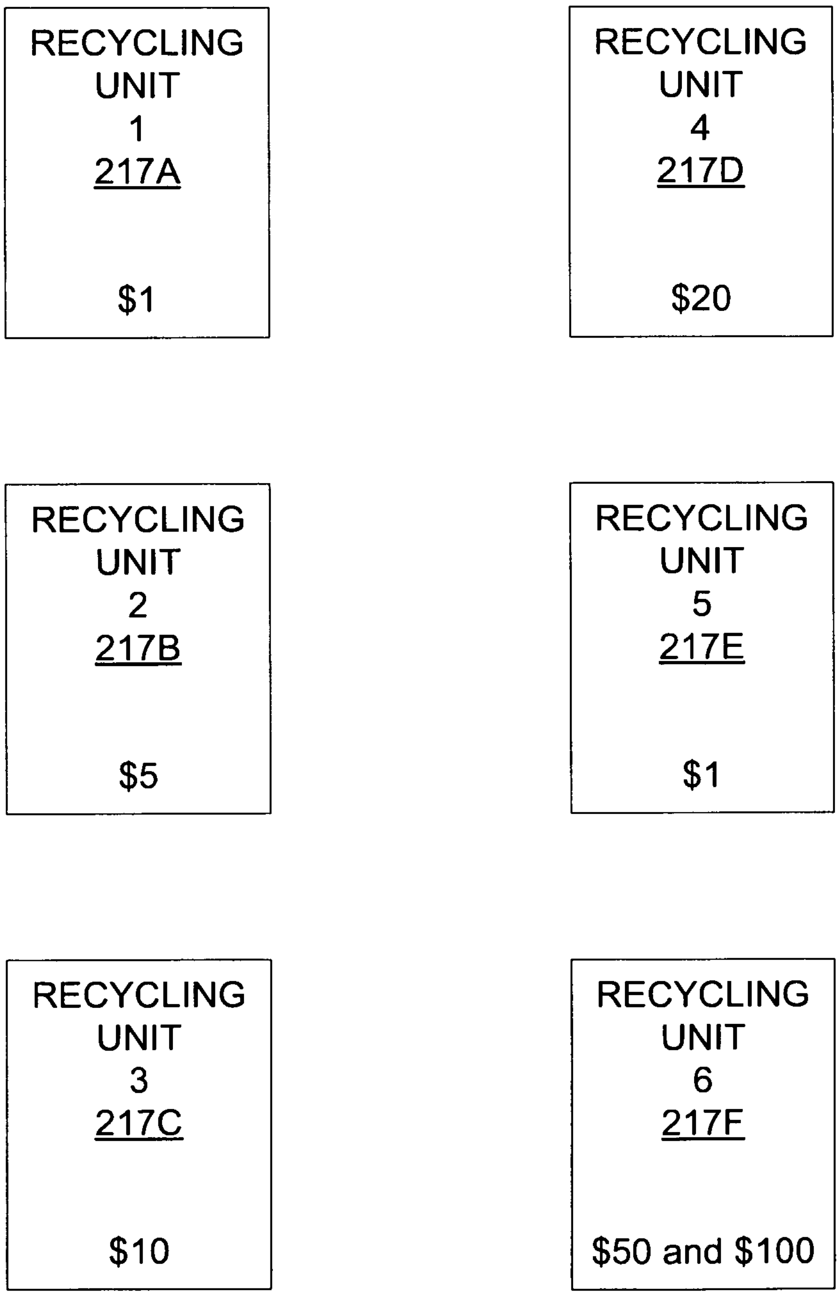

By virtue of the reallocation of units 217E and 217F in the foregoing example, greater efficiencies may be obtained with respect to the operation of a cash recycler 200 (and more specifically, recycling units 217E and 217F). These efficiencies are realized because allocating the additional recycling unit 217E to one dollar bills provides for greater margins around an average or expected transaction frequency with respect to one dollar bills. FIG. 5B reflects the allocation of recycling units 217A-217F with respect to denominations after the reallocation to accommodate a situation wherein one dollar bills are frequently recycled (e.g., where the cash recycler 200 is intended to service a business selling inexpensive merchandise).

In relation to the above example and before reallocation, and as shown in FIG. 5A, recycling unit 217A is the only recycling unit devoted to one dollar bills. Assuming that in an average business day an equal number of withdrawals and deposits with respect to one dollar bills takes place, the owner or operator of the cash recycler 200 may endeavor to fill recycling unit 217A to a point of half-capacity at the start of the business day in an effort to avoid having to service the cash recycler 200 during business hours. If there are a larger number of withdrawals of one dollar bills than deposits of one dollar bills on a particular business day in a quantity exceeding half the capacity of recycling unit 217A, then recycling unit 217A would likely be depleted of one dollar bills at some point in the day. Similarly, if the number of deposits of one dollar bills exceeded withdrawals on a particular business day in an amount exceeding half the capacity of recycling unit 217A, then recycling unit 217A would have a quantity of one dollar bills exceeding capacity limits.

After reallocation takes place (e.g., wherein unit 217E is reallocated to store one dollar bills as opposed to fifty dollar bills, as shown in FIG. 5B), and still assuming that in the average business day the number of withdrawals and deposits with respect to one dollar bills is equal, the owner or operator of cash recycler 200 may fill one or more of recycling units 217A and 217E with one dollar bills equal to half the total storage capacity of recycling units 217A and 217E at the start of the business day. Thus, as the storage capacity for a frequently recycled denomination increases, in terms of probabilities it becomes statistically less likely that a shortage or overflow condition will occur (all other things being equal). For example, after reallocation, the sensitivity to a run or streak of deposits or withdrawals of one dollar bills is decreased or improved by an amount equal to half the capacity of the additional unit 217E allocated to one dollar bills, wherein the sensitivity may represent a likelihood of experiencing an overflow or shortage of one dollar bills at some point during the business day. Allocating additional recycling units (e.g., 217D, which was devoted to twenty dollar bills initially) may further improve the margin or sensitivity with respect to frequently recycled denominations (e.g., one dollar bills in this example). However, in some embodiments (particularly those embodiments where cash recycler 200 includes limited or minimal overflow storage capacity), it may be desirable to avoid designating an excessive number of denominations as "unfit" notes because doing so may result in taking an excessive number of notes out of recycled circulation, and may quickly exhaust a holding unit's capacity.

After reallocation, and as shown in FIG. 5B, (re)allocated holding unit 217F may be used to store both one hundred dollar bills and fifty dollar bills. In one arrangement, the fifty and one hundred dollar bills may be intermixed within holding unit 217F. However, additional mechanisms may be implemented to separate denominations within overflow unit 217F. For example, a physical plate or the like may be inserted at a particular height within overflow unit 217F such that the region above the physical plate may be used for fifty dollar bills and the region below the physical plate may be used for one hundred dollar bills. Separating the denominations in the overflow unit 217F may preclude the need to separate the denominations out after a servicing operation takes place on cash recycler 200 and may reduce the likelihood of (human) error. Maintaining isolation between the denominations in holding unit 217F may simplify converting holding unit 217F back into a conventional recycling unit as described below with respect to FIG. 6.

In some embodiments, operations may take place to accommodate dynamic situations such as when a frequently recycled denomination changes as a function of time.

Figure 5C:
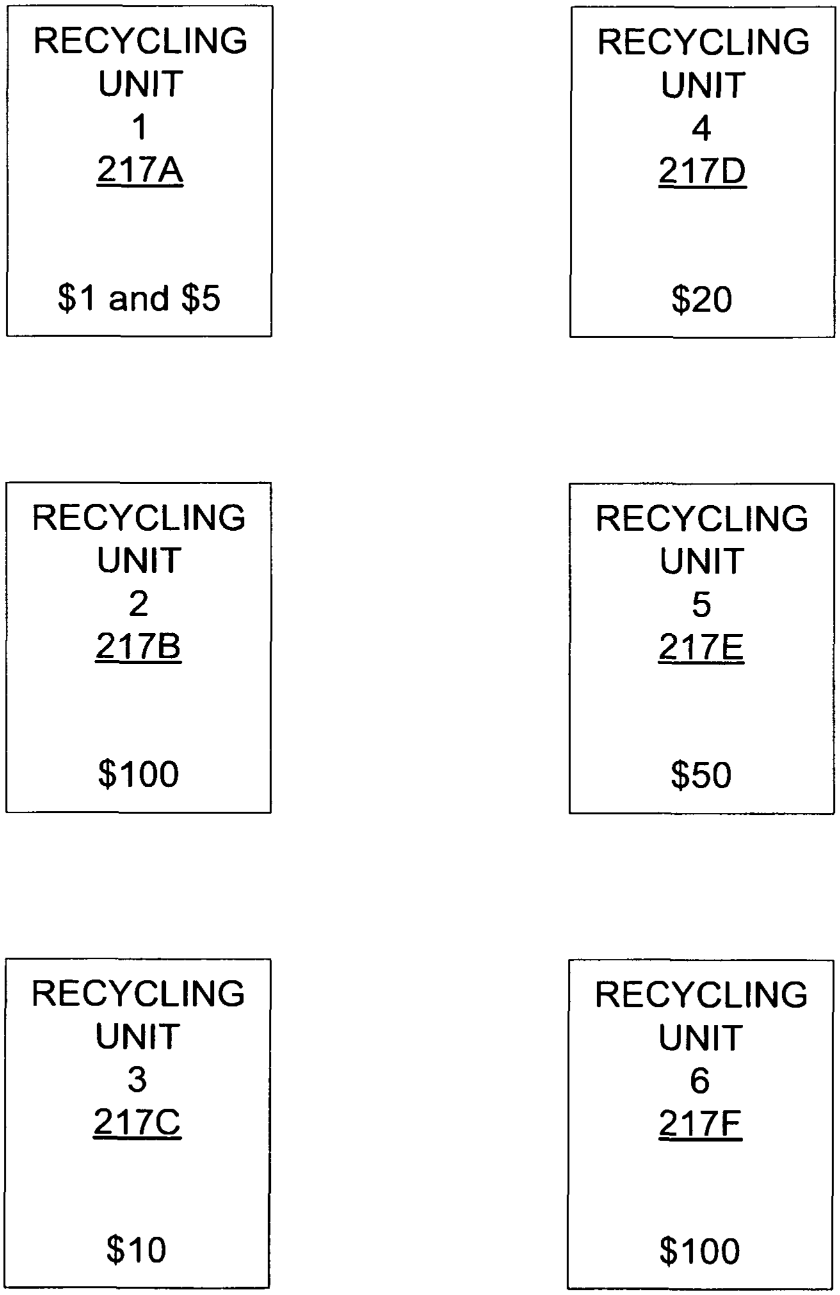

As an example of a dynamic environment, assume that the business that sells inexpensive merchandise (e.g., charm bracelets) suddenly transitions to selling high-end merchandise (e.g., diamond rings) the day after Thanksgiving (e.g., which is commonly referred to as "Black Friday" in the retail arts). Based on the increase in high-end merchandise sales, the denomination that is frequently recycled may change from one dollar bills (which was the case when the inexpensive merchandise was primarily being sold) to one hundred dollar bills. FIG. 5C illustrates recycling unit 217A-217F designations after a reallocation has taken place to accommodate one hundred dollar bills being designated as a frequently recycled denomination. As shown in FIG. 5C, the designations may be as follows: one dollar bills and five dollar bills (holding unit 217A), one hundred dollar bills (217B), ten dollar bills (217C), twenty dollar bills (217D), fifty dollar bills (217E), and one hundred dollar bills (217F), in terms of United States currency.

Figure 6:
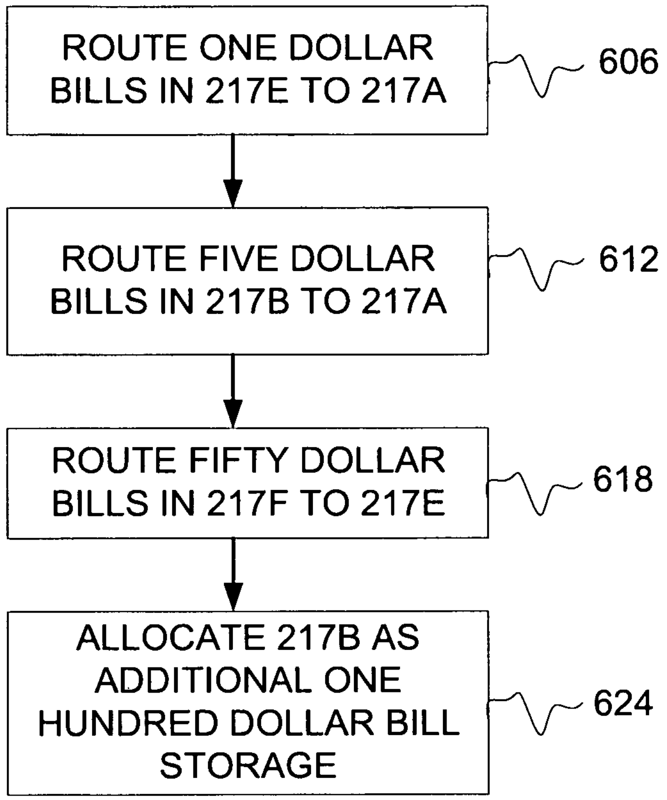
FIG. 6 illustrates a method for allocating one or more recycling units in accordance with one or more aspects of the invention.

In order to accommodate the change in the denomination that is frequently recycled, cash recycler 200 may perform a method as illustrated in FIG. 6. The method of FIG. 6, for example, may be used to facilitate a transition between the configuration of FIG. 5B (wherein one dollar bills were the frequently recycled denomination) to the configuration of FIG. 5C (wherein one hundred dollar bills are the frequently recycled denomination). However, various other methods or features may also be used to accommodate different trends and configurations.

In step 606, a routing operation may take place wherein the excess of the old frequently recycled denomination is routed into a standard recycling unit. For example, in reference to FIG. 5B, recycling unit 217E was being used to store one dollar bills when inexpensive merchandise was being sold at the business. As part of step 606, the one dollar bills in recycling unit 217E may be routed to (standard) one dollar bill recycling unit 217A. In the event that the routing of one dollar bills from recycling unit 217E to recycling unit 217A causes an overflow of one dollar bills with respect to recycling unit 217A, the excess may be transferred to a temporary storage (e.g., cartridge 215A of FIG. 2) and a warning, report or the like may be transmitted to service personnel indicating a need to service the cash recycler.

In step 612, the five dollar bills stored in recycling unit 217B may be routed to recycling unit 217A, such that recycling unit 217A may store both one dollar bills and five dollar bills as shown in FIG. 5C and be designated as an overflow unit. Similar to the above description with respect to step 606, in the event that the routing of five dollar bills to recycling unit 217A causes an overflow, the excess may be transferred to temporary storage (e.g., cartridge 215B of FIG. 2).

In step 618, the fifty dollar bills that were stored in recycling unit 217F of FIG. 5B, may be routed to (standard) fifty dollar bill recycling unit 217E. The routing of the fifty dollar bills to recycling unit 217E is simplified if separation or isolation was maintained between the fifty dollar bills and the one hundred dollar bills of recycling unit 217F in FIG. 5B as described above. If, on the other hand, the fifty dollar bills and one hundred dollar bills were intermixed in recycling unit 217F of FIG. 5B, then it may be necessary to distinguish a fifty dollar bill from a one hundred dollar bill. If it is necessary to distinguish the fifty dollar bills from the one hundred dollar bills, scanning unit 207 of FIG. 2 (or another scanning unit not shown) may be used for each bill in recycling unit 217F. If scanning unit 207 determines that a bill is a fifty dollar bill, the fifty dollar bill may be routed to recycling unit 217E, and otherwise the bill may be re-routed to recycling unit 217F. Alternatively, or additionally, given the relatively inexpensive nature of memory, a virtual map of all the bills stored in a recycling unit 217 may be maintained in memory. Based on the virtual map, each bill in recycling unit 217F may be re-routed to recycling unit 217F (in the case of a one hundred dollar bill) or routed to recycling unit 217E (in the case of a fifty dollar bill).

In step 624, recycling unit 217B may be allocated as a holding unit for the storage of one hundred dollar bills. Thus, after the execution of step 624, both recycling unit 217B and recycling unit 217F may be used to store frequently recycled one hundred dollar bills.

In one example, after the method of FIG. 6 has finished executing, the allocation of recycling units may be as shown in FIG. 5C. In particular, recycling unit 217A is designated as an overflow unit, storing one dollar bills and five dollar bills that are taken out of recycled-circulation. Recycling units 217B and 217F are allocated to the storage of frequently recycled one hundred dollar bills in FIG. 5C.

The nature of the transition described above from FIG. 5B to FIG. 5C, in conjunction with the method shown in FIG. 6, focused on a relatively abrupt shift from one dollar bills being frequently recycled to one hundred dollar bills being frequently recycled. In practical implementations, the nature of the transition will likely be smoother. For example, most stores/vendors do not simply discard of inexpensive merchandise for high-end merchandise (or vice versa) over such a short time span. Instead, there is typically a gradual transition period where the frequency of recycling with respect to a first denomination (e.g., one dollar bills) decreases and the frequency of recycling with respect to a second denomination (e.g., one hundred dollar bills) increases. As such, in actual practice, the transition may more closely approximate the allocations shown in FIG. 5B, followed by a (standard) allocation as shown in FIG. 5A, and then an allocation similar to the one shown in FIG. 5C. Cash recycler 200 may be configured to monitor trends associated with transactions conducted at the cash recycler and adjust the recycling unit configurations accordingly.

Based on the foregoing description, one of skill in the art will appreciate that denominations of cash that are less frequently recycled can be reassigned to a holding unit for the receipt and storage of notes unfit for recycling in order to provide additional storage capacity for denominations that are more frequently recycled. In this manner, users of the cash recycler can engage in deposit and withdrawal transactions, and cash may be routed to or from one or more reallocated recycling units.

The examples provided above related to a single denomination (e.g., one dollar bills, one hundred bills) being designated as a frequently recycled denomination at any given point in time. It is understood that the principles described above may be extended to accommodate treating more than one denomination as a frequently recycled denomination at a given point in time. Furthermore, one of skill in the art will appreciate that by virtue of reallocating recycling units in a cash recycler to correlate to recycling trends, servicing operations (e.g., withdrawals and deposits of cash by service personnel) with respect to the cash recycler may be minimized. Thus, security may be improved by minimizing the frequency by which cash is exposed due to servicing.

Furthermore, knowledge of recycling trends may be used to improve the operational life of the recycling units. For example, a cash denomination that is frequently recycled may be reallocated to different recycling unit(s) after a period of time elapses. In this manner, the wear and tear experienced by the recycling units can be more uniformly distributed across the recycling units, extending the operational life of the cash recycler between repair operations. As such, when a recycling unit does need to be repaired or replaced (e.g., due to a mechanical component associated with a recycling unit failing), all of the recycling units (or the common mechanical component) may be replaced based on an assumption that the failure will likely be replicated in the additional, non-failing recycling units in short order. Alternatively, in some instances it may be more cost effective to replace the entire cash recycler with an improved cash recycler platform once a failure has been detected with respect to a recycling unit, but the operational life of the cash recycler has been maximized under such a scenario.

It should be understood that any of the method steps, procedures or functions described herein may be implemented using one or more processors in combination with executable instructions that cause the processors and other components to perform the method steps, procedures or functions. As used herein, the terms “processor” and “computer” whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:

storing, by a cash recycler, an amount of a first currency of a first denomination in a first recycling unit of the cash recycler, the first recycling unit being configured to store one or more notes of the first denomination;

storing the cash recycler, an amount of a second currency of a second denomination in a second recycling unit of the cash recycler, the second recycling unit being configured to store one or more notes of the second denomination, and the second denomination being different from the first denomination;

converting, by the cash recycler, the first recycling unit of the cash recycler into a holding unit for storage at the cash recycler of one or more unfit notes of at least one non-frequently recycled denomination, the at least one non-frequently recycled denomination including the second denomination;

after converting the first recycling unit of the cash recycler into the holding unit, reallocating, by the cash recycler, the second recycling unit for storage at the cash recycler of one or more notes of a frequently recycled denomination; and based on reallocating the second recycling unit for storage at the cash recycler of the one or more notes of the frequently recycled denomination, routing, by the cash recycler, currency of the second denomination stored in the second recycling unit from the second recycling unit to the first recycling unit that has been converted into the holding unit.

2. The method of claim 1, further comprising:

storing, by the cash recycler, the routed currency of the second denomination in the first recycling unit.

3. The method of claim 2, further comprising:

after converting the first recycling unit of the cash recycler unit into the holding unit, maintaining, by the cash recycler, isolation between currency of different denominations stored in the first recycling unit using one or more physical plates to separate the currency of the different denominations.

4. The method of claim 1, further comprising:

receiving, by the cash recycler, an amount of currency of the frequently recycled denomination at the cash recycler as a deposit;

routing, by the cash recycler, the deposited amount of currency of the frequently recycled denomination to the second recycling unit; and storing, by the cash recycler, the deposited amount of currency of the frequently recycled denomination in the second recycling unit.

5. The method of claim 1, further comprising:

receiving, by the cash recycler, an amount of currency of the at least one non-frequently recycled denomination at the cash recycler as a deposit;

routing, by the cash recycler, the deposited amount of currency of the at least one non-frequently recycled denomination to the first recycling unit; and storing, by the cash recycler, the deposited amount of currency of the at least one non-frequently recycled denomination in the first recycling unit.

6. The method of claim 1, further comprising:

receiving, by the cash recycler, a request for a withdrawal of an amount of currency of the frequently recycled denomination; and routing the requested amount of currency of the frequently recycled denomination from the second recycling unit to a withdrawal slot of the cash recycler.

7. The method of claim 1, further comprising:

monitoring, by the cash recycler, one or more trends associated with transactions conducted at the cash recycler, wherein the reallocating of the second recycling unit for storage at the cash recycler of the one or more notes of the frequently recycled denomination is based on the one or more monitored trends.

8. A cash recycler comprising:

a processor; and a memory storing executable instructions that, when executed by the processor, cause the cash recycler to:

store an amount of a first currency of a first denomination in a first recycling unit of the cash recycler, the first recycling unit being configured to store one or more notes of the first denomination;

store an amount of a second currency of a second denomination in a second recycling unit of the cash recycler, the second recycling unit being configured to store one or more notes of the second denomination, and the second denomination being different from the first denomination;

convert the first recycling unit of the cash recycler into a holding unit for storage at the cash recycler of one or more unfit notes of at least one non-frequently recycled denomination, the at least one non-frequently recycled denomination including the second denomination;

after converting the first recycling unit of the cash recycler into the holding unit, reallocate the second recycling unit for storage at the cash recycler of one or more notes of a frequently recycled denomination; and based on reallocating the second recycling unit for storage at the cash recycler of the one or more notes of the frequently recycled denomination, route currency of the second denomination stored in the second recycling unit from the second recycling unit to the first recycling unit that has been converted into the holding unit.

9. The cash recycler of claim 8, wherein the executable instructions include at least one instruction that, when executed by the processor, causes the cash recycler to:

store the routed currency of the second denomination in the first recycling unit.

10. The cash recycler of claim 9, wherein the executable instructions include at least one instruction that, when executed by the processor, causes the cash recycler to:

after converting the first recycling unit of the cash recycler unit into the holding unit, maintain isolation between currency of different denominations stored in the first recycling unit using one or more physical plates to separate the currency of the different denominations.

11. The cash recycler of claim 8, wherein the executable instructions include at least one instruction that, when executed by the processor, causes the cash recycler to:

receive an amount of currency of the frequently recycled denomination at the cash recycler as a deposit;

route the deposited amount of currency of the frequently recycled denomination to the second recycling unit; and store the deposited amount of currency of the frequently recycled denomination in the second recycling unit.

12. The cash recycler of claim 8, wherein the executable instructions include at least one instruction that, when executed by the processor, causes the cash recycler to:

receive an amount of currency of the at least one non-frequently recycled denomination at the cash recycler as a deposit;

route the deposited amount of currency of the at least one non-frequently recycled denomination to the first recycling unit; and store the deposited amount of currency of the at least one non-frequently recycled denomination in the first recycling unit.

13. The cash recycler of claim 8, wherein the executable instructions include at least one instruction that, when executed by the processor, causes the cash recycler to:

receive a request for a withdrawal of an amount of currency of the frequently recycled denomination; and route the requested amount of frequently recycled currency of the frequently recycled denomination from the second recycling unit to a withdrawal slot of the cash recycler.

14. The cash recycler of claim 8, wherein the executable instructions include at least one instruction that, when executed by the processor, causes the cash recycler to:

monitor one or more trends associated with transactions conducted at the cash recycler, wherein the reallocating of the second recycling unit for storage at the cash recycler of the one or more notes of the frequently recycled denomination is based on the one or more monitored trends.

15. A non-transitory computer-readable storage medium having stored thereon executable instructions that, when executed by at least one processor of a cash recycler cause the cash recycler to:

store an amount of a first currency of a first denomination in a first recycling unit of the cash recycler, the first recycling unit being configured to store one or more notes of the first denomination;

store an amount of a second currency of a second denomination in a second recycling unit of the cash recycler, the second recycling unit being configured to store one or more notes of the second denomination, and the second denomination being different from the first denomination;

convert the first recycling unit of the cash recycler into a holding unit for storage at the cash recycler of one or more unfit notes of at least one non-frequently recycled denomination, the at least one non-frequently recycled denomination including the second denomination;

after converting the first recycling unit of the cash recycler into the holding unit, reallocate the second recycling unit for storage at the cash recycler of one or more notes of a frequently recycled denomination; and based on reallocating the second recycling unit for storage at the cash recycler of the one or more notes of the frequently recycled denomination, route currency of the second denomination stored in the second recycling unit from the second recycling unit to the first recycling unit that has been converted into the holding unit.

16. The non-transitory computer-readable storage medium of claim 15, wherein the executable instructions include at least one instruction that, when executed by the at least one processor of the cash recycler, further cause the cash recycler to:

store the routed currency of the second denomination in the first recycling unit.

17. The non-transitory computer-readable storage medium of claim 16, wherein the executable instructions include at least one instruction that, when executed by the at least one processor of the cash recycler, further cause the cash recycler to:

after converting the first recycling unit of the cash recycler unit into the holding unit, maintain isolation between currency of different denominations stored in the first recycling unit using one or more physical plates to separate the currency of the different denominations.

18. The non-transitory computer-readable storage medium of claim 15, wherein the executable instructions include at least one instruction that, when executed by the at least one processor of the cash recycler, further cause the cash recycler to:

receive an amount of currency of the frequently recycled denomination at the cash recycler as a deposit;

route the deposited amount of currency of the frequently recycled denomination to the second recycling unit; and store the deposited amount of currency of the frequently recycled denomination in the second recycling unit.

19. The non-transitory computer-readable storage medium of claim 15, wherein the executable instructions include at least one instruction that, when executed by the at least one processor of the cash recycler, further cause the cash recycler to:

receive an amount of currency of the at least one non-frequently recycled denomination at the cash recycler as a deposit;

route the deposited amount of currency of the at least one non-frequently recycled denomination to the first recycling unit; and store the deposited amount of currency of the at least one non-frequently recycled denomination in the first recycling unit.

20. The non-transitory computer-readable storage medium of claim 15, wherein the executable instructions include at least one instruction that, when executed by the at least one processor of the cash recycler, further cause the cash recycler to:

receive a request for a withdrawal of an amount of currency of the frequently recycled denomination; and route the requested amount of currency of the frequently recycled denomination from the second recycling unit to a withdrawal slot of the cash recycler.

21. The non-transitory computer-readable storage medium of claim 15, wherein the executable instructions include at least one instruction that, when executed by the at least one processor of the cash recycler, further cause the cash recycler to:

monitor one or more trends associated with transactions conducted at the cash recycler, wherein the reallocating of the second recycling unit for storage at the cash recycler of the one or more notes of the frequently recycled denomination is based on the one or more monitored trends.

* * * * *